(12) United States Patent
Kanie et al.

(10) Patent No.: US 6,801,683 B2
(45) Date of Patent: Oct. 5, 2004

(54) OPTICAL MODULE, LIGHT DIVIDER/INSERTOR AND LIGHT TRANSMISSION DEVICE

(75) Inventors: Tomohiko Kanie, Yokohama (JP); Makoto Katayama, Yokohama (JP); Hiroshi Suganuma, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/331,493

(22) Filed: Dec. 31, 2002

(65) Prior Publication Data

US 2004/0008921 A1 Jan. 15, 2004

Related U.S. Application Data

(60) Provisional application No. 60/395,618, filed on Jul. 15, 2002.

(30) Foreign Application Priority Data

Jul. 15, 2002 (JP) .................................... P2002-205941

(51) Int. Cl.[7] .............................. G02B 6/35; G02B 6/12
(52) U.S. Cl. .............................. 385/18; 385/14; 385/16; 385/129
(58) Field of Search ...................... 385/14–23, 129–130

(56) References Cited

U.S. PATENT DOCUMENTS

| | | | |
|---|---|---|---|
| 4,569,569 A | 2/1986 | Stewart ........................ | 385/36 |
| 5,960,132 A | 9/1999 | Lin ............................. | 385/18 |
| 6,031,946 A * | 2/2000 | Bergmann et al. ............ | 385/18 |
| 6,148,124 A | 11/2000 | Aksyuk et al. ................ | 385/24 |
| 6,154,584 A | 11/2000 | Lindgren et al. .............. | 385/16 |
| 6,240,222 B1 | 5/2001 | Bergmann .................... | 385/24 |
| 6,363,183 B1 | 3/2002 | Koh ............................ | 385/19 |
| 6,404,969 B1 | 6/2002 | Tayebati et al. ............. | 385/140 |
| 6,449,068 B1 | 9/2002 | Turner et al. ................. | 398/38 |
| 6,522,800 B2 * | 2/2003 | Lucero ........................ | 385/16 |
| 2001/0026385 A1 | 10/2001 | Cao ............................ | 398/79 |
| 2002/0061165 A1 | 5/2002 | Kawarai ...................... | 385/24 |
| 2002/0067908 A1 | 6/2002 | Katayama et al. | |
| 2002/0071154 A1 | 6/2002 | Gerstel et al. ................ | 398/83 |
| 2002/0154854 A1 | 10/2002 | Tayebati et al. ............. | 385/18 |
| 2003/0012509 A1 * | 1/2003 | Chang et al. ................. | 385/50 |

FOREIGN PATENT DOCUMENTS

JP        2002-116330        4/2002

OTHER PUBLICATIONS

C.R. Giles, et al. "Reconfigurable 16–Channel WDM DROP Module Using Silicon MEMS Optical Switches." IEEE Photonics Technology Letters vol. 11, No. 1, Jan.1999 pp. 63–65.

* cited by examiner

*Primary Examiner*—John D. Lee
(74) *Attorney, Agent, or Firm*—McDermott Will & Emery LLP

(57) ABSTRACT

An optical module has a planar waveguide which is provided with an optical circuit for an optical switch formed by 2×2 cross optical waveguides $A_1$ to $D_1$ and an optical circuit for an optical variable attenuator formed by 2×2 cross optical waveguides $A_2$ to $D_2$. Joined onto the planar waveguide is an actuator structure and the actuator structure is constituted by an actuator section for an optical switch and an actuator section for an optical variable attenuator. The optical circuit of the planar waveguide and the actuator section constitute an optical switch, whereas the optical circuit of the planar waveguide 2 and the actuator section constitute an optical variable attenuator.

13 Claims, 14 Drawing Sheets

OPTICAL MODULE, LIGHT DIVIDER/INSERTOR AND LIGHT TRANSMISSION DEVICE

CROSS-REFERENCE TO RELATED APPLICATION

This application claims priority to Provisional Application Ser. No. 60/395,618 filed on Jul. 15, 2002, which is/are hereby incorporated by reference in its/their entirety.

BACKGROUND OF THE INVENTION

1. Field of the Invention

The present invention relates to an optical module, an optical add/drop apparatus, and an optical transmission apparatus which are used in optical communications and the like.

2. Related Background Art

Known as an example of optical modules employed in optical communications and the like is the WDM DROP module described in IEEE Photonics Technology Letters, Vol. 11, No. 1, January 1999. This module has a configuration in which optical components such as an optical switch and an optical variable attenuator are connected to each other with an optical fiber and contained in a housing.

In the above-mentioned prior art, however, the optical components such as an optical switch and an optical variable attenuator are prepared separately from each other, whereby it takes time and labor to make these optical components, and the manufacturing cost becomes higher.

SUMMARY OF THE INVENTION

It is an object of the present invention to provide an optical module, an optical add/drop apparatus, and an optical transmission apparatus which can be manufactured easily at a low cost.

In one aspect, the present invention provides an optical module comprising at least one optical switch and at least one optical variable attenuator; the optical module further comprising a planar optical waveguide having a first optical circuit constituting a part of the optical switch and a second optical circuit constituting a part of the optical variable attenuator; and an actuator structure, connected to the planar optical waveguide, having a first actuator section constituting a part of the optical switch and a second actuator section constituting a part of the optical variable attenuator.

In this aspect of the present invention, the first optical circuit of the planar waveguide and the first actuator section of the actuator structure constitute an optical switch, whereas the second optical circuit of the planar waveguide and the second actuator section of the actuator structure constitute an optical variable attenuator. Since the first and second optical circuits are thus integrated in one planar waveguide, a part of the optical switch and a part of the optical variable attenuator are prepared collectively, whereby the optical switch and optical variable attenuator can be made easily at a low cost. Also, when such a planar waveguide having first and second optical circuits is used, it is unnecessary for the optical switch and optical variable attenuator to be connected to each other with an optical fiber when they are needed to be connected together. This can make the optical module smaller, while reducing the splice loss.

Preferably, the first optical circuit has an optical waveguide formed like a cross across a groove provided in the planar waveguide; whereas the first actuator section comprises a movable mirror for reflecting light passing through the optical waveguide, and driving means for moving the movable mirror, the movable mirror being disposed so as to be inserted into the groove. When the movable mirror is located at a predetermined position, for example, the light passing through one optical waveguide is reflected by the movable mirror so as to be guided to another optical waveguide located on the same side of the groove. If the movable mirror is moved by the driving means from this state, the light passing through one optical waveguide will pass through the groove, so as to be guided to another optical waveguide located on the opposite side of the groove. Thus, an optical switch constituted by the first optical switch and first actuator section can be realized with a simple configuration.

Preferably, the second optical circuit has an optical waveguide formed like a cross across a groove provided in the planar waveguide; whereas the second actuator section comprises a movable mirror for reflecting light passing through the optical waveguide, and driving means for moving the movable mirror, the movable mirror being disposed so as to be inserted into the groove. When the movable mirror is located at a predetermined position, for example, the light passing through one optical waveguide is totally reflected by the movable mirror so as to be guided to another optical waveguide located on the same side of the groove, whereby the amount of optical attenuation is minimized. If the movable mirror is moved by the driving means from this state, only a part of the light passing through the optical waveguide will be reflected by the movable mirror, whereby the amount of optical attenuation will increase. Thus, an optical variable attenuator constituted by the second optical switch and second actuator section can be realized with a simple configuration utilizing the reflection of light effected by the movable mirror.

Preferably, in the above-mentioned case, the movable mirror is attached to a cantilever supported on the planar waveguide; whereas the driving means comprises an electrode disposed on the planar waveguide, and means for generating an electrostatic force between the cantilever and the electrode. When an electrostatic force is utilized for driving the movable mirror as such, no current flow is necessary, whereby the power consumption can be reduced.

Preferably, a plurality of optical switches and a plurality of optical variable attenuators, each having a width of 500 μm or less, are arranged in arrays. As a consequence, an optical module having a plurality of optical switches and a plurality of optical variable attenuators can be made smaller and highly integrated.

In another aspect, the present invention provides an optical module comprising at least one optical switch and at least one optical coupler; the optical module further comprising a planar optical waveguide having a first optical circuit constituting a part of the optical switch and a second optical circuit constituting the optical coupler; and an actuator structure, connected to the planar optical waveguide, constituting a part of the optical switch.

In this aspect of the present invention, the first optical circuit of the planar waveguide and the actuator structure constitute an optical switch, whereas the second optical circuit of the planar waveguide constitutes an optical coupler. Since the first and second optical circuits are thus integrated in one planar waveguide, a part of the optical switch and the optical coupler are prepared together, whereby the optical switch and optical coupler can be made easily at a low cost. Also, when such a planar waveguide having first and second optical circuits is used, it is unnecessary for the optical switch and optical coupler to be connected to each other with an optical fiber when they are needed to be connected together. This can make the optical module smaller, while reducing the splice loss.

Preferably, the first optical circuit has an optical waveguide formed like a cross across a groove provided in the planar waveguide; whereas the actuator structure comprises a movable mirror for reflecting light passing through the optical waveguide, and driving means for moving the movable mirror, the movable mirror being disposed so as to be inserted into the groove. In this case, as mentioned above, an optical switch constituted by the first optical circuit and actuator structure can be realized with a simple configuration.

Preferably, in this case, the movable mirror is attached to a cantilever supported on the planar waveguide; whereas the driving means comprises an electrode disposed on the planar waveguide, and means for generating an electrostatic force between the cantilever and the electrode. As a consequence, no current flow is necessary, whereby the power consumption can be reduced.

In still another aspect, the present invention provides an optical add/drop apparatus comprising the above-mentioned optical module. When the optical module has an optical switch and an optical variable attenuator, for example, the optical switch is constituted by the first optical circuit of the planar waveguide and the first actuator section of the actuator structure, whereas the optical variable attenuator is constituted by the second optical circuit of the planar waveguide and the second actuator section of the actuator structure, whereby the optical switch and optical variable attenuator can be made easily at a low cost as mentioned above.

In still another aspect, the present invention provides an optical transmission apparatus comprising the above-mentioned optical module. In this case, the optical switch of the optical module is constituted by the first optical circuit of the planar waveguide and the actuator structure, whereas the optical coupler of the optical module is constituted by the second optical circuit of the planar waveguide, whereby the optical switch and optical coupler can be made easily at a low cost as mentioned above. The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, preferred embodiments of the optical module, optical add/drop apparatus, and optical transmission apparatus in accordance with the present invention will be explained with reference to the drawings.

Figure 1:
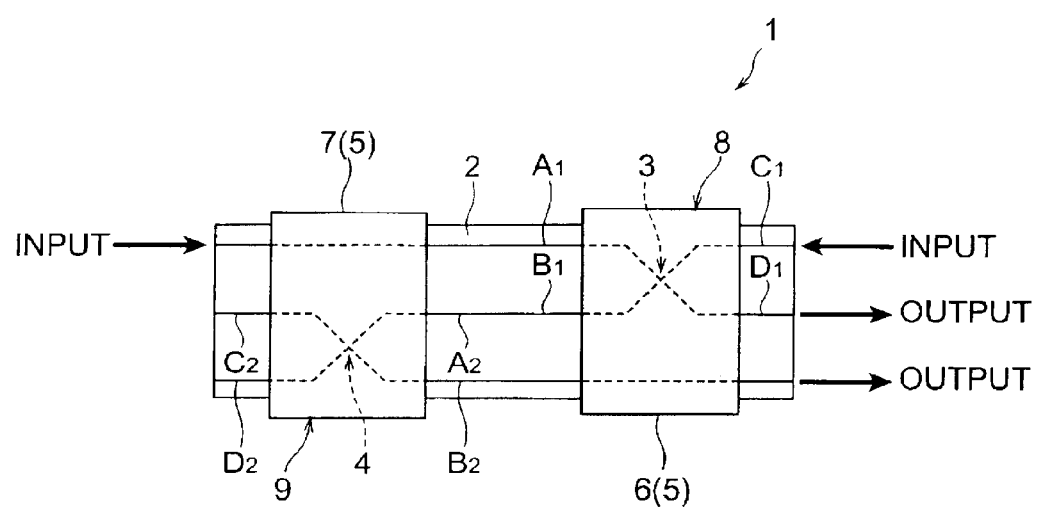
FIG. 1 shows a schematic diagram showing an embodiment of the optical module in accordance with the present invention.

FIG. 1 is a schematic diagram showing an embodiment of the optical module in accordance with the present invention. In FIG. 1, the optical module 1 of this embodiment has a planar waveguide 2. This planar waveguide 2 comprises an optical circuit 3 for an optical switch formed by 2×2 cross optical waveguides $A_1$ to $D_1$, and an optical circuit 4 for an optical variable attenuator formed by 2×2 cross optical waveguides $A_2$ to $D_2$. The optical waveguides $B_1$ and $A_2$ are directly connected together.

Joined onto the planar waveguide 2 is a chip-shaped actuator structure 5 formed by using a microelectromechanical system (MEMS) technology. The actuator structure 5 is constituted by an actuator section 6 for an optical switch, and an actuator section 7 for an optical variable attenuator.

The optical circuit 3 of the planar waveguide 2 and the actuator section 6 constitute a 2×2 optical switch 8, whereas the optical switch 4 of the planar waveguide 2 and the actuator section 7 constitute an optical variable attenuator 9.

Figure 2:
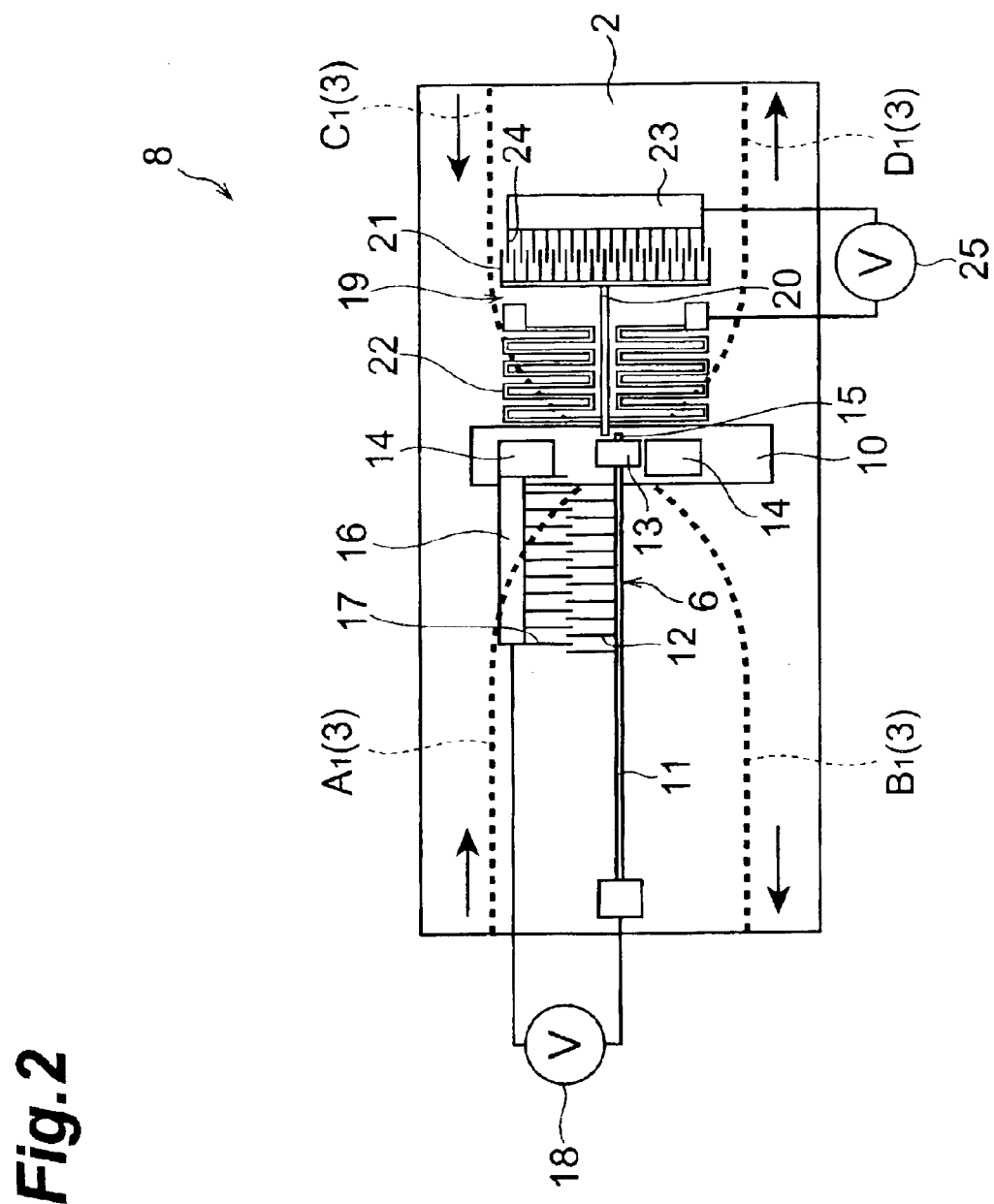
FIG. 2 shows a plan view of the optical switch shown in FIG. 1.
Figure 3:
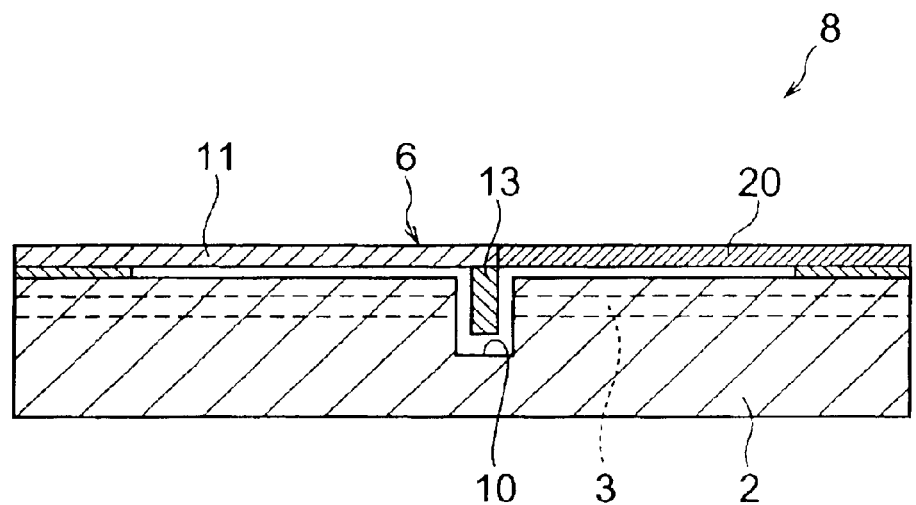
FIG. 3 shows a vertical sectional view of the optical switch shown in FIG. 1.

FIGS. 2 and 3 show the configuration of the optical switch 8. In these drawings, the planar waveguide 2 is provided with a groove 10, across which the optical waveguides $A_1$ to $D_1$ are formed like a cross.

The actuator section 6 of the optical switch 8 is joined onto the upper face of the planar waveguide 2 while being positioned by flip-chip bonding and the like. The actuator section 6 has a cantilever 11 supported on the upper face of the planar waveguide 2, whereas the cantilever 11 is provided with a plurality of teeth 12 on its leading end side.

Secured to the leading end part of the cantilever 11 is a movable mirror 13 for reflecting toward the optical waveguides $B_1$, $D_1$ the light passing through the optical waveguides $A_1$, $C_1$. The movable mirror 13 is configured so as to be movable longitudinally of the groove 10 of the planar waveguide 2 while in a state inserted in the groove 10. The groove 10 is provided with stoppers 14 for restricting the amount of movement of the movable mirror 13. The front face of the movable mirror 13 is provided with a position-keeping projection 15.

Also, the actuator section 6 has an electrode 16 disposed on the upper face of the planar waveguide 2. This electrode 16 is provided with a plurality of teeth 17 alternately inserted between the teeth 12 of the cantilever 11.

Preferably, from the viewpoint of reducing the cost, the cantilever 11, the movable mirror 13, and the electrode 16 are formed from Si having a conductivity.

The cantilever 11 and the electrode 16 are connected to each other by way of a voltage source 18, which applies a predetermined voltage (pulsed signal) between the cantilever 11 and the electrode 16, thereby generating an electrostatic force therebetween. Due to this electrostatic force, the leading end side of the cantilever 11 is attracted to the electrode 16 and flexes, along which the movable mirror 13 moves toward the electrode 16 while in a state inserted in the groove 10 (see FIG. 4).

Since the electrostatic force is generated between the cantilever 11 and the electrode 16 so as to drive the movable mirror 13 as such, the power can be saved. Also, since the cantilever 11 is provided with the teeth 12 while the electrode 16 is provided with the teeth 17, the surface area of the cantilever 11 and electrode 16 becomes greater as a whole. Hence, the electrostatic force generated between the cantilever 11 and the electrode 16 increases proportionally, whereby the voltage applied therebetween can be lowered.

The actuator section 6 further comprises a position-keeping mechanism 19 disposed on the front face side of the movable mirror 13. The position-keeping mechanism 19 allows the movable mirror 13 to hold itself with no power at a blocking position where the movable mirror 13 reflects light and at a through position where the movable mirror 13 transmits light therethrough.

The position-keeping mechanism 19 has a T-shaped movable part 20, whereas the base end of the movable part 20 is provided with a plurality of teeth 21. Connected to the movable part 20 is an elastic member 22 having a spring force directed to the movable mirror 13. Both ends of the elastic member 22 are secured to the upper face of the planar waveguide 2. Disposed on the upper face of the planar waveguide 2 is an electrode 23, which is provided with a plurality of teeth 24 alternately inserted between the teeth 21 of the movable part 20. Such individual parts of the position-keeping mechanism are also formed from Si having a conductivity.

The elastic member 22 and the electrode 23 are connected to each other by way of a voltage source 25. The voltage source 25 applies a predetermined voltage (pulsed signal) between the elastic member 22 and the electrode 23, thereby generating an electrostatic force there between. Due to this electrostatic force, the movable part 20 connected to the elastic member 22 is attracted toward the electrode 23 while the elastic member 22 contracts against the urging force.

In the state where no voltage is supplied from the voltage source 18 in such an optical switch 8, the cantilever 11 extends straight as shown in FIG. 2, whereby the movable mirror 13 is located at the blocking position. Here, no voltage is supplied from the voltage source 25, and the leading end of the movable part 20 engages the position-keeping projection 15 at the front face of the movable mirror 13, whereby the movable mirror 13 holds itself at the blocking position.

In this state, the light emitted from the optical waveguide $A_1$ is reflected by the movable mirror 13, so as to enter the optical waveguide $B_1$, whereas the light emitted from the optical waveguide $C_1$ is reflected by the movable mirror 13, so as to enter the optical waveguide $D_1$.

Figure 4:
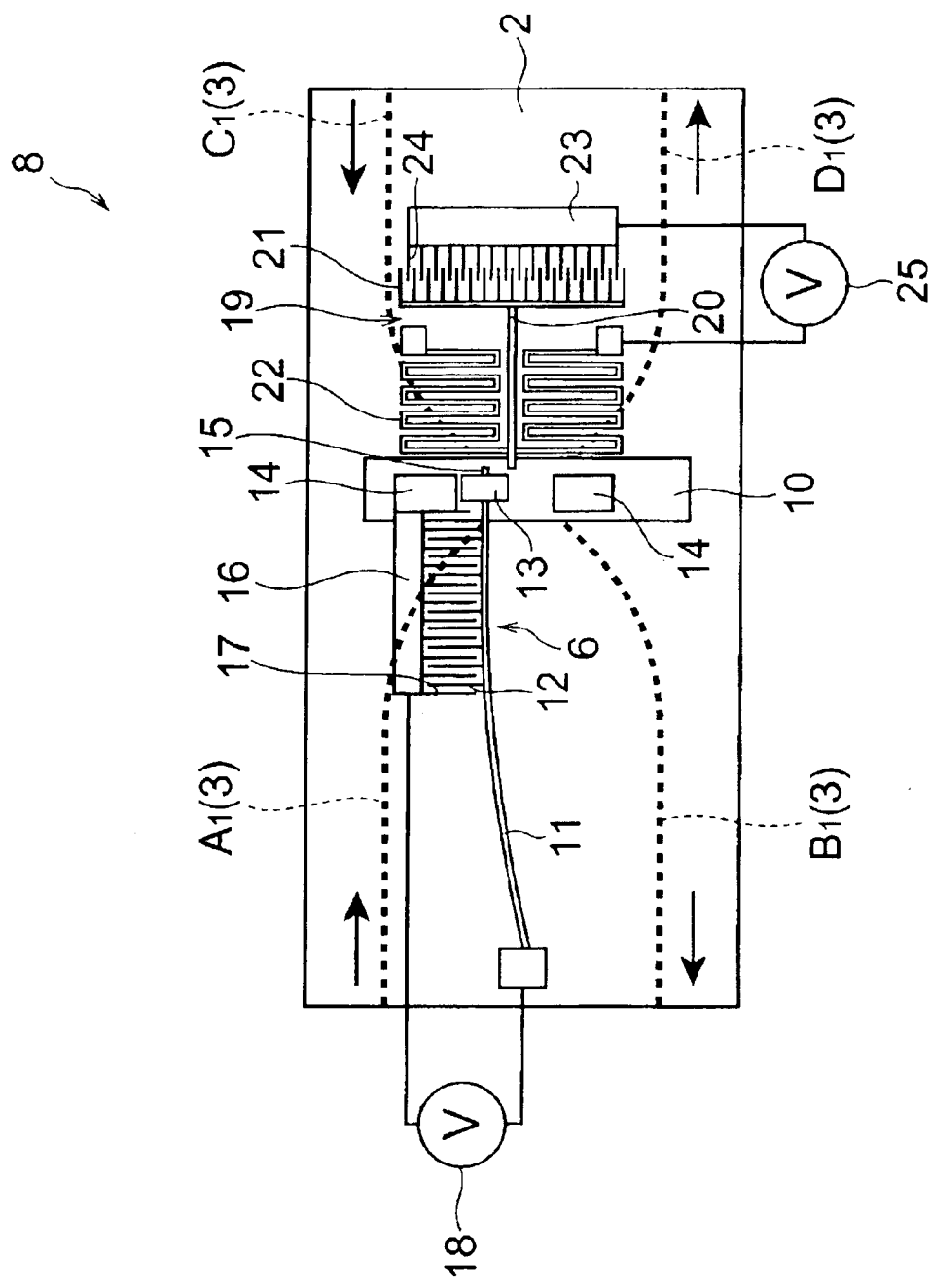
FIG. 4 shows a plan view showing an operating state of the actuator section shown in FIG. 2.

If the voltage source 25 applies a voltage between the elastic member 22 and the electrode 23 from such an initial state, the movable part 20 moves toward the electrode 23 due to the electrostatic force occurring between the movable part 20 and the electrode 23, thereby releasing the engagement of the leading end of the movable part 20. If the voltage source 18 applies a voltage between the cantilever 11 and the electrode 16 in this state, the cantilever 11 moves toward the electrode 16 due to the electrostatic force occurring therebetween, whereby the movable mirror 13 moves to the through position as shown in FIG. 4. If the voltage source 25 stops applying the voltage, the movable part 20 moves toward the movable mirror 13 due to the urging force of the elastic member 22 as shown in FIG. 4, so that the leading end of the movable part 20 engages the position-keeping projection 15 at the front face of the movable mirror 13, whereby the movable mirror 13 holds itself at the through position.

In this state, the light emitted from the optical waveguide $A_1$ enters the optical waveguide $D_1$ through the groove 10, whereas the light emitted from the optical waveguide $C_1$ enters the optical waveguide $B_1$ through the groove 10.

Figure 5:
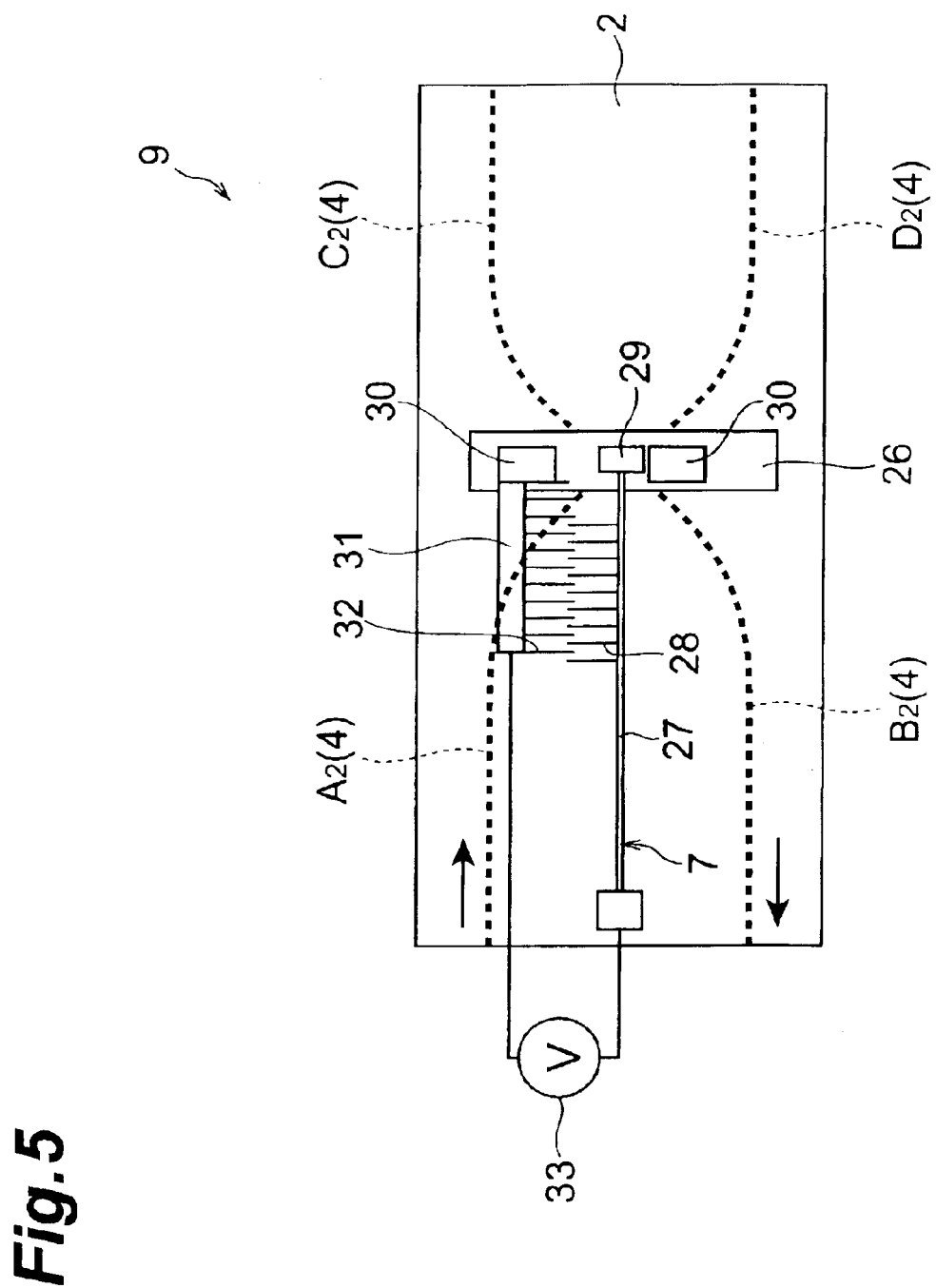
FIG. 5 shows a plan view of the optical variable attenuator shown in FIG. 1.
Figure 6:
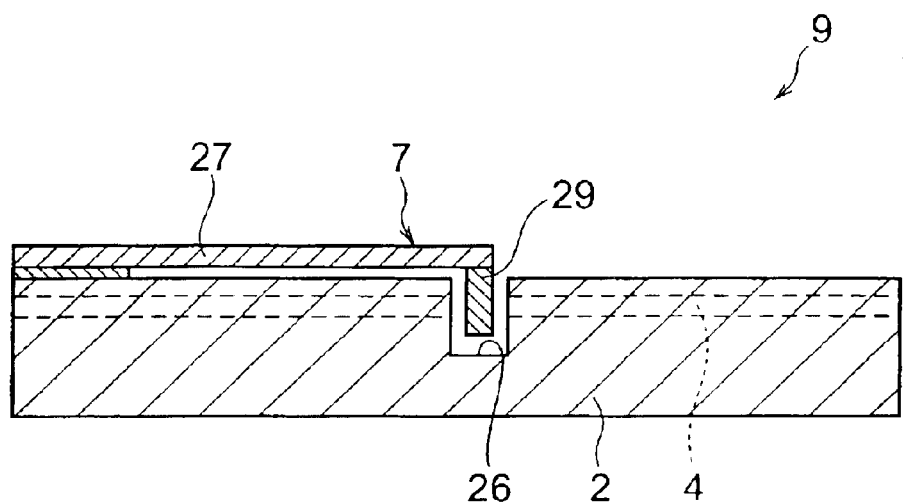
FIG. 6 shows a vertical sectional view of the optical variable attenuator shown in FIG. 1.

FIGS. 5 and 6 show the configuration of the optical variable attenuator 9. In these drawings, the planar waveguide 2 is provided with a groove 26 which is different from the above-mentioned groove 10, whereas optical waveguides $A_2$ to $D_2$ are formed like a cross across the groove 26.

The actuator section 7 of the optical variable attenuator 9 is joined to the upper face of the planar waveguide 2 while being positioned by flip-chip bonding and the like. The actuator section 7 has a cantilever 27 supported on the upper face of the planar waveguide 2, whereas the cantilever 27 is provided with a plurality of teeth 28 on its leading end side.

Secured to the leading end part of the cantilever 27 is a movable mirror 29 for reflecting toward the optical waveguide $B_2$ the light passing through the optical waveguides $A_2$. The movable mirror 29 is configured so as to be movable longitudinally of the groove 26 of the planar waveguide 2 while in a state inserted in the groove 26. The groove 26 is provided with stoppers 30 for restricting the amount of movement of the movable mirror 29.

Also, the actuator section 7 has an electrode 31 disposed on the upper face of the planar waveguide 2. This electrode 31 is provided with a plurality of teeth 32 alternately inserted between the teeth 28 of the cantilever 27.

As in the actuator section 6 of the optical switch 8, the cantilever 27, the movable mirror 29, and the electrode 31 are formed from Si having a conductivity.

The cantilever 27 and the electrode 31 are connected to each other by way of a voltage source 33, which applies a predetermined voltage (pulsed signal) between the cantilever 27 and the electrode 31, thereby generating an electrostatic force therebetween. Due to this electrostatic force, the leading end side of the cantilever 27 is attracted to the electrode 31 and flexes, along which the movable mirror 29 moves toward the electrode 31 while in a state inserted in the groove 26 (see FIG. 7).

In the state where no voltage is supplied from the voltage source 33 in such an optical variable attenuator 9, the cantilever 27 extends straight as shown in FIG. 5. In this state, the light emitted from the optical waveguide $A_2$ is totally reflected by the movable mirror 29, so as to enter the optical waveguide $B_2$, whereby the minimal amount of optical attenuation will be obtained as a function of the optical attenuator.

If the voltage source 33 applies a voltage between the cantilever 27 and the electrode 31 from such an initial state, the movable mirror 29 moves toward the electrode 31 due to the electrostatic force occurring between the cantilever 27 and the electrode 31. In this state, only a part of the light emitted from the optical waveguide $A_2$ is reflected by the movable mirror 29, so as to enter the optical waveguide $B_2$, whereas the rest of light enters the optical waveguide $D_2$, thereby increasing the amount of optical attenuation.

Figure 7:
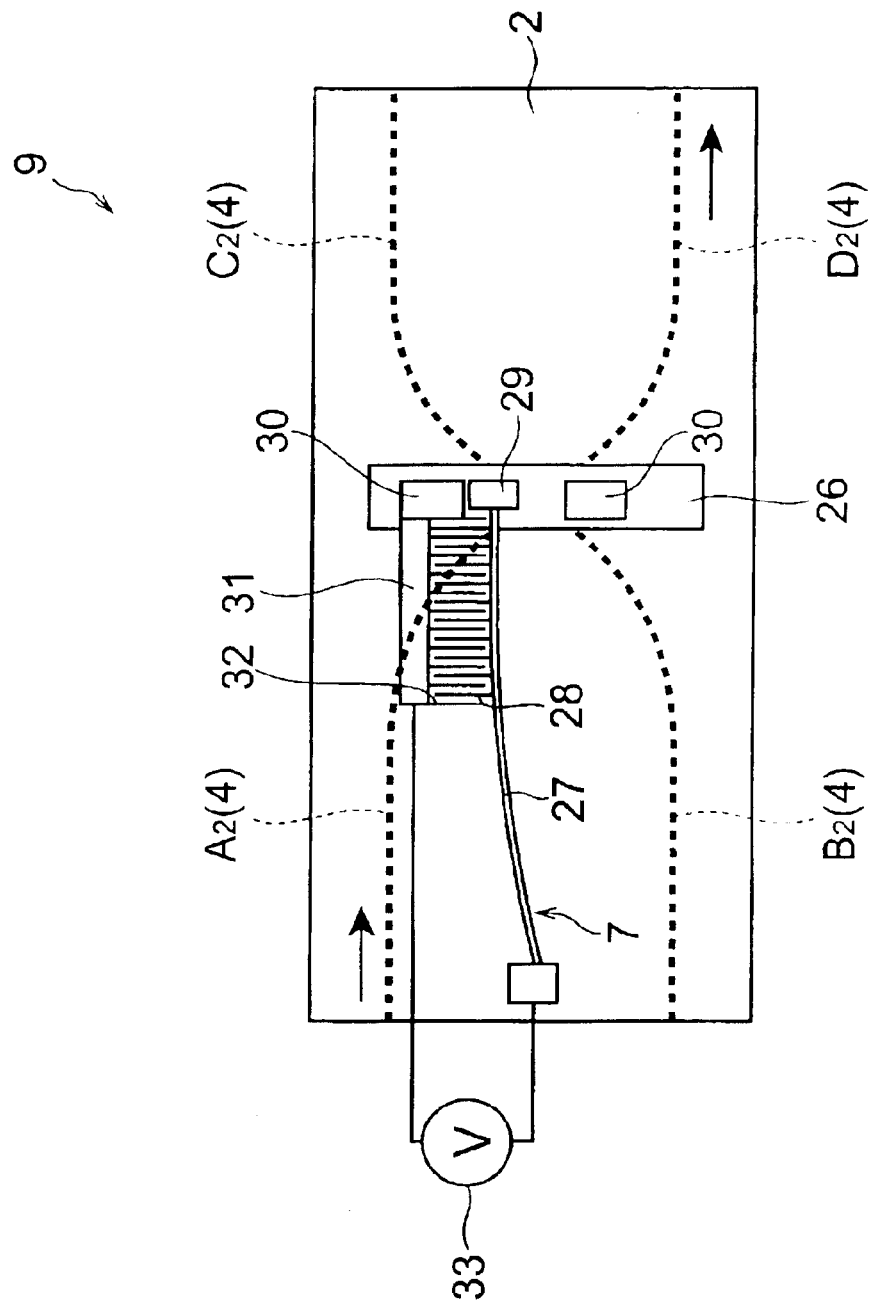
FIG. 7 shows a plan view showing an operating state of the actuator section shown in FIG. 5.

If the voltage applied between the cantilever 27 and the electrode 31 is further raised, the movable mirror 29 completely disengages from the optical waveguides $A_2$, $B_2$ as shown in FIG. 7. In this state, the light emitted from the optical waveguide $A_2$ totally enters the optical waveguide $D_2$ without being reflected by the movable mirror 29, whereby the amount of optical attenuation is infinite (in the so-called shutter state).

Thus, in the optical variable attenuator 9, the voltage applied between the cantilever 27 and the electrode 31 is changed in an analog fashion, so as to make the quantity of reflected light variable at the movable mirror 29, thereby regulating the amount of optical attenuation. Here, the cantilever 27 is provided with the teeth 28, whereas the electrode 31 is provided with the teeth 32, the leading end side of the cantilever 27 and the electrode 31 being located close to each other. Hence, the linearity of amount of optical attenuation with respect to the applied voltage becomes favorable, thus making it easier to control the amount of optical attenuation.

The optical module 1 of this embodiment has a plurality of optical switches 8 and a plurality of optical variable attenuators 9, each of which is mentioned above. Namely, the planar waveguide 2 is provided with a plurality of optical circuits 3 for optical switches and a plurality of optical circuits 4 for optical variable attenuators. Joined to the upper face of the planar waveguide 2 area plurality of actuator sections 6 for optical switches and a plurality of actuator sections 7 for optical variable attenuators. A plurality of optical circuits 3 and a plurality of actuator sections 6 constitute an optical switch array 34, whereas a plurality of optical circuits 4 and a plurality of actuator sections 7 constitute an optical variable attenuator array 35 (see FIG. 8).

For making the optical module 1 smaller and highly integrated, the optical switches 8 of the optical switch array 34 and the optical variable attenuators 9 of the optical variable attenuator array 35 are arranged into arrays while each having a width of 500 μm or less.

Figure 8:
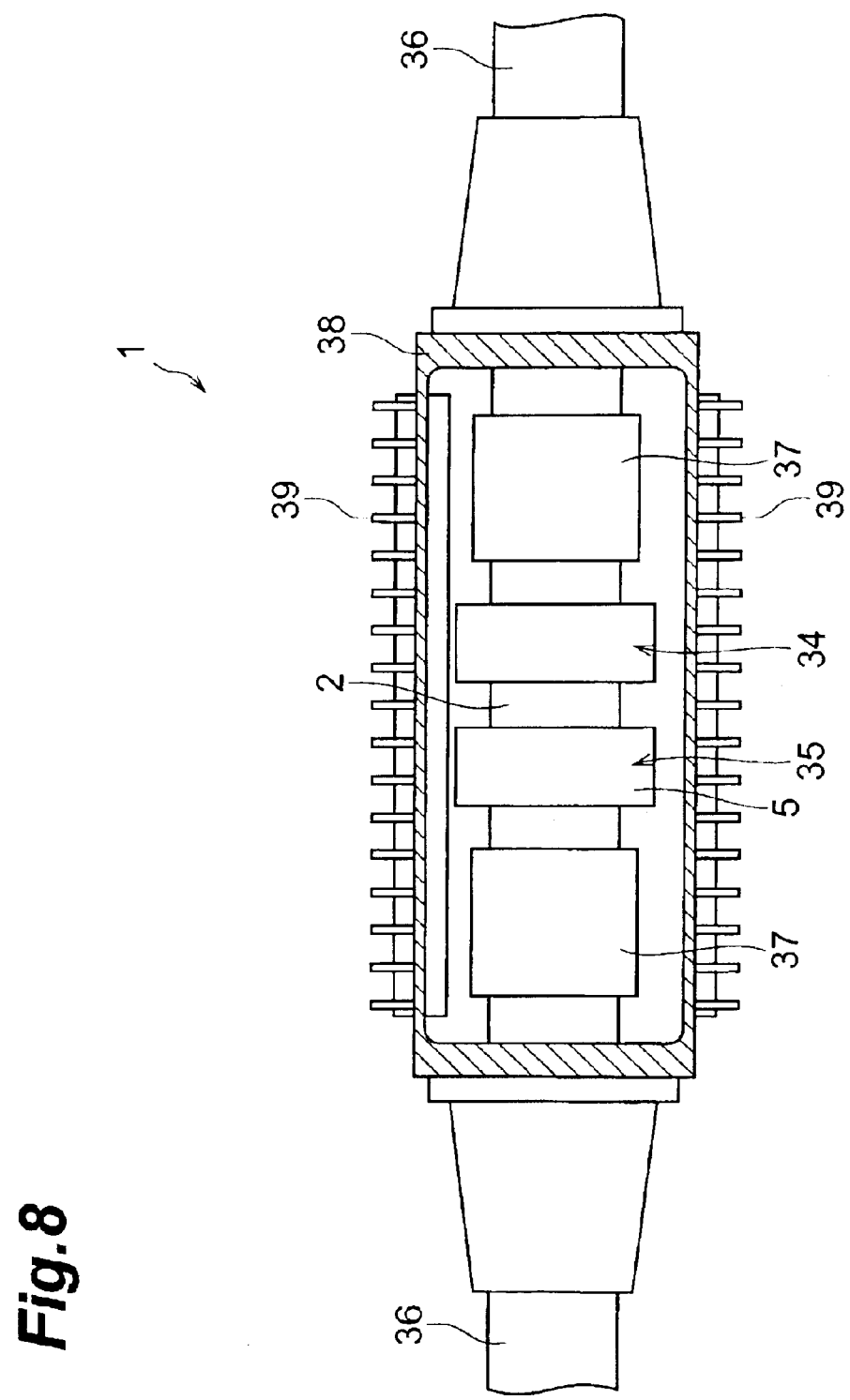
FIG. 8 shows a sectional view showing a state where the optical switch and optical variable attenuator shown in FIG. 1 are contained in a package.

As shown in FIG. 8, fiber arrays 37 holding optical fibers of a multi-filament optical fiber tape 36 are connected in a tuned fashion to both end faces of the planar waveguide 2 constituting a part of the optical switch 8 and optical variable attenuator 9, so that light is taken out by the optical fibers to the outside. The planar waveguide 2, actuator structures 5, and fiber arrays 37 are contained in a single package 38. The electrode terminals (not depicted) of the actuator structures 5 and outer electrode terminals 39 provided in the package 38 are connected to each other with wire bonds (not depicted).

Returning to FIG. 1, if the optical switch 8 is OFF in the optical module 1 configured as in the foregoing, optical signals fed into the optical waveguide $A_1$ pass through the optical waveguides $B_1$, $A_2$, and are outputted from the optical waveguide $B_2$ after being attenuated by the optical variable attenuator 9. Optical signals fed into the optical waveguide $C_1$ are outputted from the optical waveguide $D_1$. If the optical switch 8 is ON, by contrast, optical signals fed into the optical waveguide $A_1$ are outputted from the optical waveguide $D_1$. Optical signals fed into the optical waveguide $C_1$ pass through the optical waveguides $B_1$, $A_2$, and are outputted from the optical waveguide $B_2$ after being attenuated by the optical variable attenuator 9.

Since the optical module 1 of the forgoing embodiment is configured such that an optical path constituting a part of the optical switch 8 and an optical path constituting a part of the optical variable attenuator 9 are formed and integrated in a single planar waveguide 2, the optical circuits for the optical switch 8 and optical variable attenuator 9 can be prepared collectively, and the number of components required for the optical switch 8 and optical variable attenuator 9 becomes smaller. Consequently, the optical switch and optical variable attenuator can be made more easily at a lower cost than in the case where the optical switch and the optical variable attenuator are made separately from each other. Also, since the optical path for the optical switch 8 and the optical path for the optical variable attenuator 9 are connected to each other in the single planar waveguide 2 instead of connecting the optical path for the optical switch and the optical path for the optical variable attenuator to each other with an optical fiber, the splice loss decreases, thus yielding better optical characteristics. Also, in this case, no space is necessary for arranging optical fibers, whereby the optical module can be made smaller.

Figure 9:
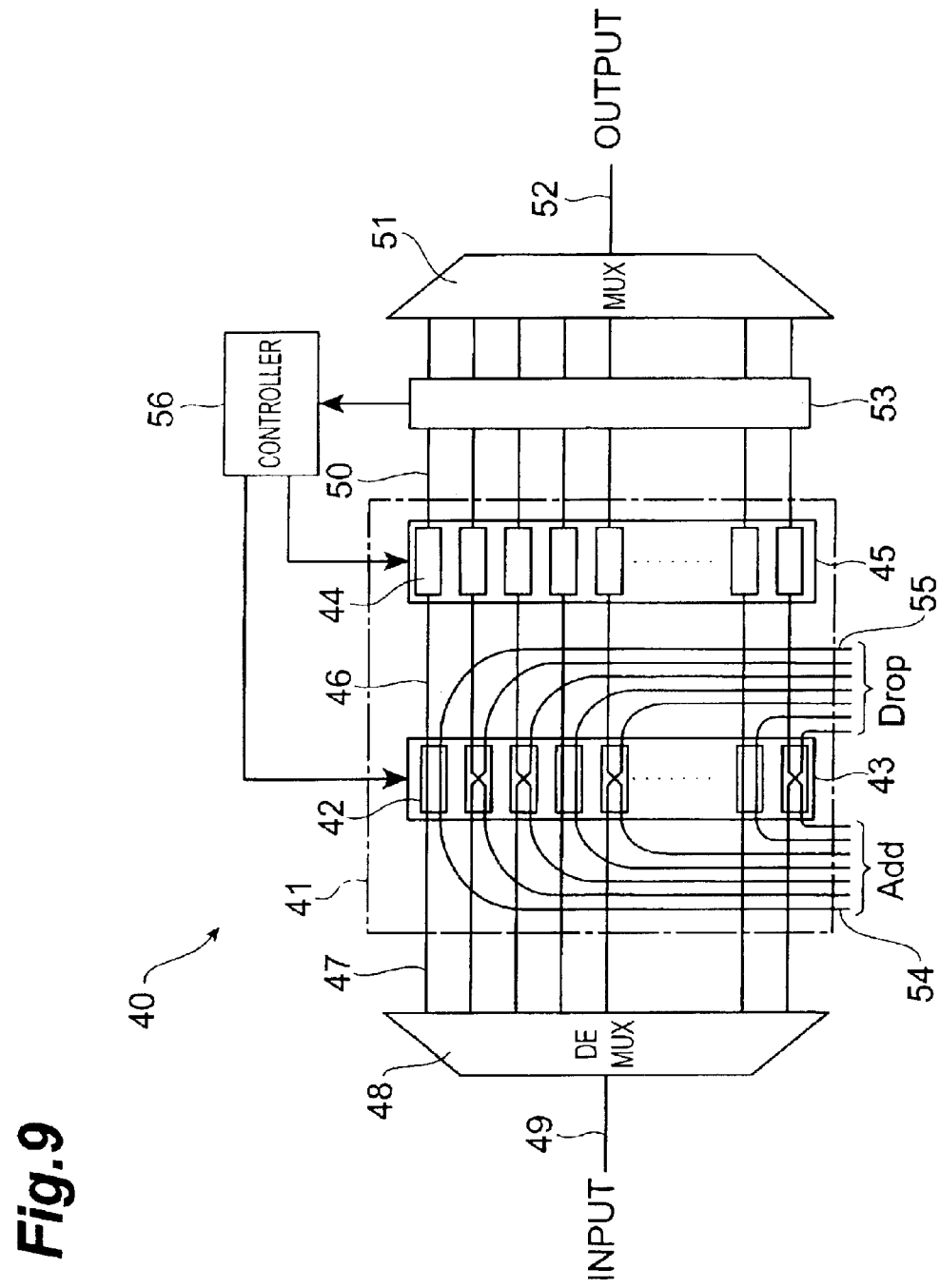
FIG. 9 shows a diagram showing an example of the optical add/drop apparatus employing the optical module shown in FIG. 1.

FIG. 9 shows an example of optical add/drop apparatus (OADM) employing the above-mentioned optical module 1. The optical add/drop apparatus has a function of adding/dropping a given wavelength of signal to/from wavelength division multiplexed signals.

In FIG. 9, the optical add/drop apparatus 40 has an optical module 41. The optical module 41 has an optical switch array 43 comprising a plurality of optical switches 42, and an optical variable attenuator array 45 comprising a plurality of optical variable attenuators 44. The individual optical switches 42 are connected to their corresponding optical variable attenuators 44 by way of respective optical waveguides 46. The individual optical switches 42 are connected to a demultiplexer 48 by way of respective input waveguides 47. The demultiplexer 48 demultiplexes a plurality of optical signals having wavelengths different from each other propagated through a single optical fiber 49 into individual wavelengths. The individual optical variable attenuators 44 are connected to a multiplexer 51 by way of respective output waveguides 50. The multiplexer 51 multiplexes the individual wavelengths of optical signals and guides thus multiplexed signal into a single optical fiber 52. The output waveguides 50 are provided with an optical monitor 53 for detecting the power of light attenuated by the optical variable attenuators 44. Connected to each optical switch 42 are an Add waveguide 54 and a Drop waveguide 55.

The optical switch array 43, optical variable attenuator array 45, and optical monitor 53 are connected to a controller 56. The controller 56 has a plurality of voltage sources for supplying voltages to the respective optical switches 42, and a plurality of voltage sources for supplying voltages to the respective optical variable attenuators 44. The controller 56 sends a voltage signal to each optical switch 42, so as to make it change over optical paths of the optical waveguides 46, 47, 54, 55. Also, according to the value detected by the optical monitor 53, the controller 56 sends a voltage signal to each optical variable attenuator 44 so as to attain a desirable value of output light quantity.

Figure 10:
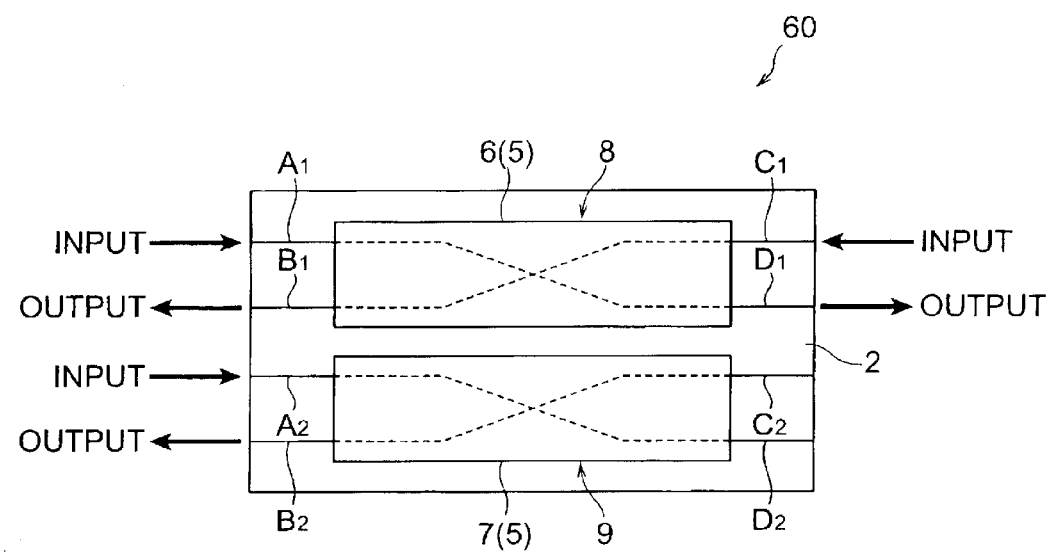
FIG. 10 shows a schematic diagram showing another embodiment of the optical module in accordance with the present invention.

FIG. 10 is a schematic diagram showing another embodiment of the optical module in accordance with the present invention. In the drawing, members identical or equivalent to those of the above-mentioned embodiment will be referred to with numerals or letters identical thereto without repeating their overlapping explanations.

In FIG. 10, the optical module 60 of this embodiment has an optical switch 8 and an optical variable attenuator 9 which are disposed in parallel, and is configured such that the optical switch 8 and optical variable attenuator 9 can be used independently from each other. Namely, in the planar waveguide 2, a set of cross optical waveguides $A_1$ to $D_1$ and a set of cross optical waveguides $A_2$ to $D_2$ are disposed in parallel. Joined to the upper face of the planar waveguide 2 are actuator sections 6, 7 of the actuator structure 5.

When the optical switch 8 is OFF in such an optical module 60, optical signals fed into the optical waveguide $A_1$ are outputted from the optical waveguide $B_1$, whereas optical signals fed into the optical waveguide $C_1$ are outputted from the optical waveguide $D_1$. When the optical switch 8 is ON, by contrast, optical signals fed into the optical waveguide $A_1$ are outputted from the optical waveguide $D_1$, whereas optical signals fed into the optical waveguide $C_1$ are outputted from the optical waveguide $B_1$. On the other hand, optical signals fed into the optical waveguide $A_2$ are outputted from the optical waveguide $B_2$ after being attenuated by an optical variable attenuator 62.

Figure 11:
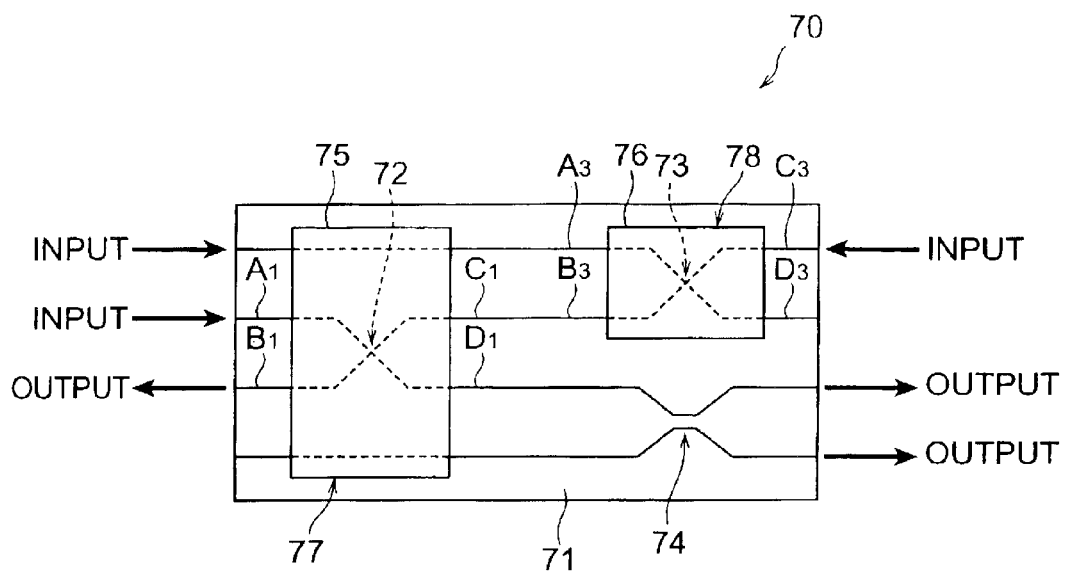
FIG. 11 shows a schematic diagram showing still another embodiment of the optical module in accordance with the present invention.

FIG. 11 is a schematic diagram showing still another embodiment of the optical module in accordance with the present invention. In the drawing, members identical or equivalent to those of the above-mentioned embodiments will be referred to with numerals or letters identical thereto without repeating their overlapping explanations.

In FIG. 11, the optical module 70 of this embodiment has a planar waveguide 71. This planar waveguide 71 is provided with an optical circuit 72 for an optical switch formed by 2×2 cross optical waveguides $A_1$ to $D_1$, an optical circuit 73 for an optical switch formed by 2×2 cross optical waveguides $A_3$ to $D_3$, and an optical coupler 74 formed by an optical waveguide. The optical waveguides $B_3$ and $C_1$ are directly connected to each other, whereas the optical waveguide $D_1$ and the optical coupler 74 are directly connected to each other. Joined onto the planar waveguide 71 are actuator sections 75, 76. The actuator sections 75, 76 are configured similar to the actuator section 6 for an optical switch.

The optical circuit 72 of the planar waveguide 71 and the actuator section 75 constitute a 2×2 optical switch 77, whereas the optical circuit 73 of the planar waveguide 71 and the actuator section 76 constitute a 2×1 optical switch 78.

When both of the optical switches 77, 78 are OFF in such an optical module 70, optical signals fed into the optical waveguide $A_1$ are outputted from the optical waveguide $B_1$. Optical signals fed into the optical waveguide $A_3$ pass through the optical waveguides $B_3$, $C_1$, $D_1$, and then are outputted by way of the optical coupler 74. When the optical switch 78 is OFF while the optical switch 77 is ON, optical signals fed into the optical waveguide $A_1$ pass through the optical waveguide $D_1$, and then are outputted by way of the optical coupler 74. When the optical switch 77 is OFF while the optical switch 78 is ON, optical signals fed into the optical waveguide $C_3$ pass through the optical waveguides $B_3$, $C_1$, $D_1$, and then are outputted by way of the optical coupler 74. When both of the optical switches 77, 78 are ON, optical signals fed into the optical waveguide $C_3$ pass through the optical waveguides $B_3$, $C_1$, $B_1$, so as to be outputted.

In the optical module 70 of the foregoing embodiment, the optical circuit constituting optical switches 77, 78 and the optical circuit constituting the optical coupler 74 are integrated in a single planar waveguide 71, whereby these optical circuits can be made collectively. As a consequence, optical switches and optical couplers can be made easily at a low cost.

Figure 12:
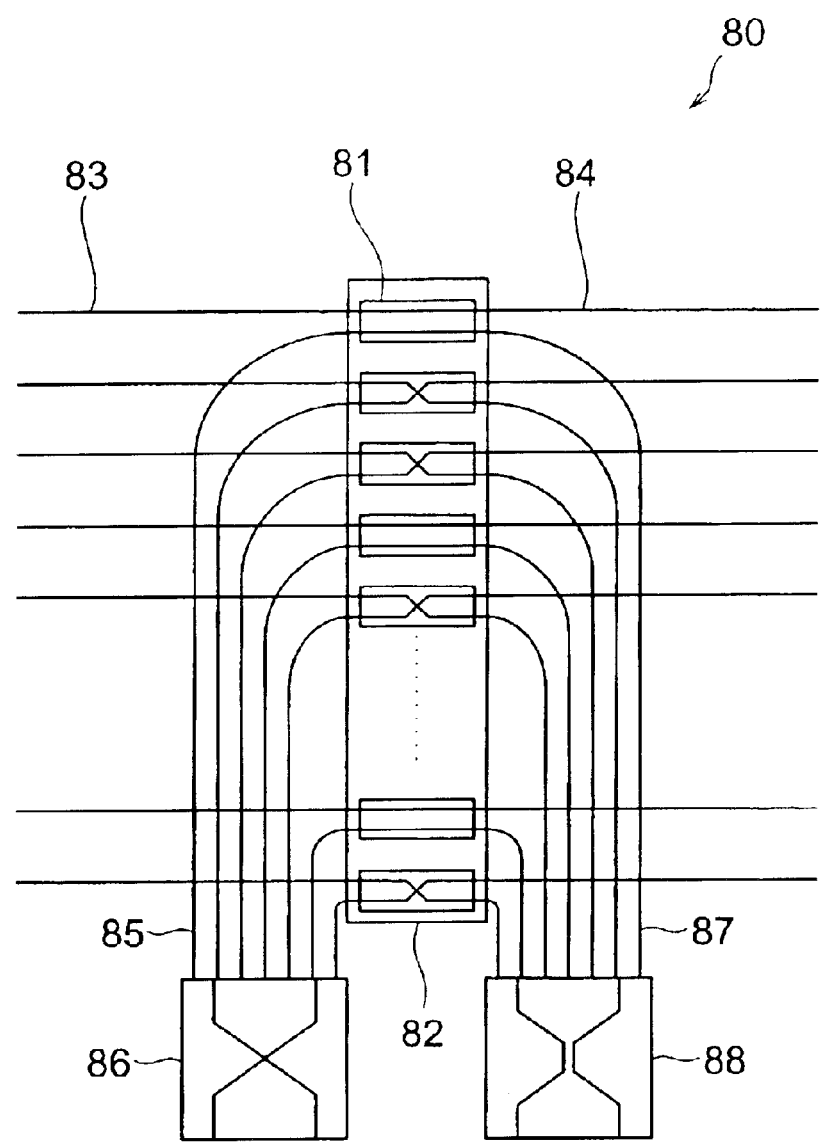
FIG. 12 shows a diagram showing an example of the optical add/drop apparatus employing the optical module shown in FIG. 11.

FIG. 12 shows an example of optical add/drop apparatus employing the above-mentioned optical module 70.

The optical add/drop apparatus 80 in FIG. 12 has an optical switch array 82 comprising a plurality of optical switches 81. The optical switches 81 are connected to a demultiplexer (not depicted) by way of their corresponding input waveguides 83, and to a multiplexer (not depicted) by way of their corresponding output waveguides 84. Also, the optical switches 81 are connected to an optical switch 86 by way of their corresponding Add waveguides 85, and are connected to an optical coupler 88 by way of their corresponding Drop waveguides 87. Such a configuration makes it possible to add/drop a given wavelength of signal to/from wavelength division multiplexed signals.

Figure 13:
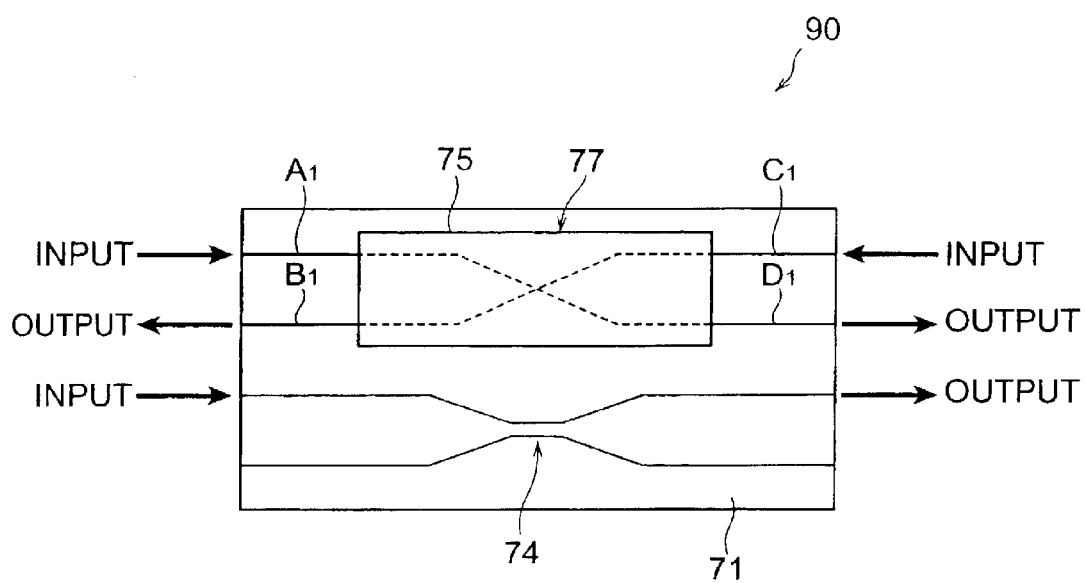
FIG. 13 shows a schematic diagram showing still another embodiment of the optical module in accordance with the present invention.

FIG. 13 is a schematic diagram showing still another embodiment of the optical module in accordance with the present invention. In the drawing, members identical or equivalent to those of the above-mentioned embodiments will be referred to with numerals or letters identical thereto without repeating their overlapping explanations.

In FIG. 13, the optical module 90 of this embodiment has an optical switch 77 and an optical coupler 74 which are disposed in parallel, and is configured such that the optical switch 77 and optical coupler 74 can be used independently from each other. Namely, in the planar waveguide 71, a set of cross optical waveguides $A_1$ to $D_1$ and the optical coupler 74 are disposed in parallel. Joined to the upper face of the planar waveguide 71 is an actuator section 75 of the optical switch 77.

Figure 14:
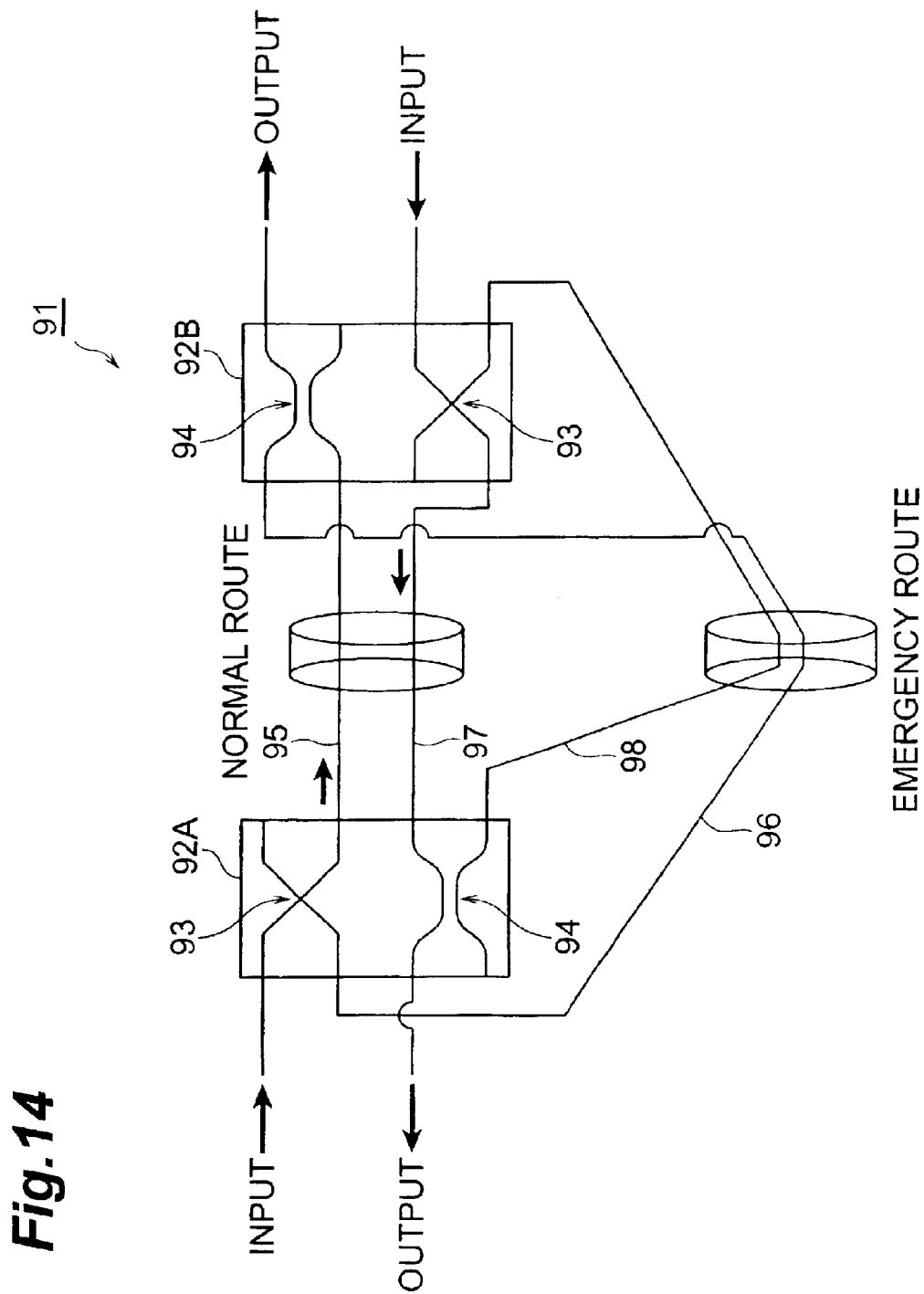
FIG. 14 shows a diagram showing an example of the optical transmission apparatus employing the optical module shown in FIG. 13.

FIG. 14 shows an example of optical transmission apparatus employing the above-mentioned optical module 90.

The optical transmission apparatus 91 in FIG. 14 carries out bidirectional optical transmission, and has two sets of optical modules 92A, 92B. Each of the optical modules 92A, 92B has an optical switch 93 and an optical coupler 94 which are disposed in parallel. The optical switch 93 of the optical module 92A and the optical coupler 94 of the optical module 92B are connected to each other by way of optical fibers 95, 96, whereas the optical coupler 94 of the optical module 92A and the optical switch 93 of the optical module 92B are connected to each other by way of optical fibers 97, 98.

In such an optical transmission apparatus 91, both of the optical switches 93 of the optical modules 92A, 92B are usually in their ON state. In this state, optical signals fed into the optical module 92A are sent to the optical module 92B by way of the optical fiber 95, whereas optical signals fed into the optical module 92B are sent to the optical module 92A by way of the optical fiber 97. When a failure or the like occurs in the optical fibers 95, 97, by contrast, both of the optical switches 93 of the optical modules 92A, 92B are turned OFF. In this state, optical signals fed into the optical module 92A are sent to the optical module 92B by way of an optical fiber 96, whereas optical signals fed into the optical module 92B are sent to the optical module 92A by way of an optical fiber 98.

The present invention is not limited to the above-mentioned embodiments. For example, though the actuator section for an optical switch and the actuator section for an optical variable attenuator are constituted by separate chips in the above-mentioned embodiments, these actuator sections may be constructed as a single chip.

Though the optical variable attenuator in the above-mentioned embodiments is of a reflection type utilizing the light reflected by a movable mirror, also employable is a transmission type in which an optical device having a slit is provided in place of the movable mirror, so as to change the quantity of light transmitted through the optical device, whereby the amount of optical attenuation is made variable. When such a transmission type optical variable attenuator is employed, the optical waveguide formed in the planar waveguide may be a linear waveguide instead of a 2×2 cross optical waveguide.

Though the above-mentioned embodiments are configured such that light is reflected by a movable mirror when the optical switch and optical variable attenuator are in their OFF state, it is not restrictive. Also employable is a configuration in which the movable mirror moves to a light-reflecting position when the optical switch and optical variable attenuator are turned ON.

Though the movable mirrors of the optical switch and optical variable attenuator are driven by electrostatic actuators in the above-mentioned embodiments, electromagnetic actuators driving movable mirrors by utilizing an electromagnetic force and the like may be used as well.

Since the present invention provides a configuration in which a planar waveguide having a first optical circuit constituting a part of an optical switch and a second optical circuit constituting a part of an optical variable attenuator, and an actuator structure having a first actuator section constituting a part of the optical switch and a second actuator section constituting a part of the optical variable attenuator are joined together, an optical module having the optical switch and optical variable attenuator can be made easily at a low cost.

Also, since the present invention provides a configuration in which a planar waveguide having a first optical circuit constituting a part of an optical switch and a second optical circuit constituting an optical coupler, and an actuator structure constituting a part of the optical switch are joined together, an optical module having the optical switch and optical coupler can be made easily at a low cost.

The basic Japanese Application No. 2002-205941 filed on Jul. 15, 2002 is hereby incorporated by reference.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical module comprising;
   at least one optical switch;
   at least one optical variable attenuator;
   a planar optical waveguide member having a first optical circuit constituting a part of the optical switch and a second optical circuit constituting a part of the optical variable attenuator; and
   an actuator structure, supported by the planar optical waveguide member, having a first actuator section constituting a part of the optical switch and a second actuator section constituting a part of the optical variable attenuator;
   the first optical circuit having two optical waveguides which are formed in the planar optical waveguide member and cross over to each other and a groove provided at a cross region of the two optical waveguides.

2. An optical module according to claim 1, wherein the first actuator section comprises a movable mirror for reflecting light passing through the optical waveguide, and driving means for moving the movable mirror, the movable mirror being disposed so as to be inserted into the groove.

3. An optical module according to claim 1, further comprising a second actuator section, the second actuator section comprising a movable mirror for reflecting light passing through the optical waveguide, and driving means for moving the movable mirror, the movable mirror being disposed so as to be inserted into the groove.

4. An optical module according to claim 1, wherein a plurality of the optical switches and a plurality of the optical variable attenuators, each having a width of 500 µm or less, are arranged in arrays.

5. An optical add/drop apparatus comprising the optical module according to claim 1.

6. An optical module comprising at least one optical switch and at least one optical variable attenuator;
   the optical module further comprising:
      a planar optical waveguide member having a first optical circuit constituting a part of the optical switch and a second optical circuit constituting a part of the optical variable attenuator; and
      an actuator structure, supported by the planar optical waveguide member, having a first actuator section constituting a part of the optical switch and a second actuator section constituting a part of the optical variable attenuator,
   wherein the first optical circuit having two optical waveguides which are formed in the planar optical waveguide member and cross over to each other and a groove provided at a cross region of the two optical waveguides;
   the first actuator section comprises a movable mirror for reflecting light passing through the optical waveguide, and driving means for moving the movable mirror, the movable mirror being disposed so as to be inserted into the groove;
   the movable mirror is attached to a cantilever supported by the planar waveguide member; and
   the driving means comprises an electrode supported by the planar waveguide member, and means for generating an electrostatic force between the cantilever and the electrode.

7. An optical module comprising at least one optical switch and at least one optical coupler;
   the optical module further comprising:
      a planar optical waveguide member having a first optical circuit constituting a part of the optical switch and a second optical circuit constituting the optical coupler; and
      an actuator structure, supported by the planar optical waveguide member, constituting a part of the optical switch, the first optical circuit having two optical waveguides which are formed in the planar optical waveguide member and cross over to each other and a groove provided at a cross regions of the two optical waveguides.

8. An optical module according to claim 7, further comprising a second actuator section which comprises a movable mirror for reflecting light passing through the optical waveguide, and driving means for moving the movable mirror, the movable mirror being disposed so as to be inserted into the groove.

9. An optical add/drop apparatus comprising the optical module according to claim 7.

10. An optical transmission apparatus comprising the optical module according to claim 7.

11. An optical module comprising at least one optical switch and at least one optical coupler;
the optical module further comprising:
a planar optical waveguide member having a first optical circuit constituting a part of the optical switch and a second optical circuit constituting the optical coupler; and
an actuator structure, supported by the planar optical waveguide member, constituting a part of the optical switch,
wherein the first optical circuit having two optical waveguides which are formed in the planar optical waveguide member and cross over to each other and a groove provided at a cross region of the two optical waveguides;
a second actuator section comprises a movable mirror for reflecting light passing through the optical waveguide, and driving means for moving the movable mirror, the movable mirror being disposed so as to be inserted into the groove;
the movable mirror is attached to a cantilever supported by the planar waveguide member; and
the driving means comprises an electrode supported by the planar waveguide member, and means for generating an electrostatic force between the cantilever and the electrode.

12. An optical module comprising at least one optical switch and at least one optical variable attenuator;
the optical module further comprising:
a planar optical waveguide member having a first optical circuit constituting a part of the optical switch and a second optical circuit constituting a part of the optical variable attenuator; and
an actuator structure, supported by the planar optical waveguide member, having a first actuator section constituting a part of the optical switch and a second actuator section constituting a part of the optical variable attenuator,
wherein the first optical circuit having two optical waveguides which are formed in the planar optical waveguide member and cross over to each other and a groove provided at a cross region of the two optical waveguides;
the first actuator section comprises a movable mirror for reflecting light passing through the optical waveguide member, and driving means for moving the movable mirror, the movable mirror being disposed so as to be inserted into the groove; and
the movable mirror is attached to a cantilever supported by the planar waveguide member.

13. An optical module comprising at least one optical switch and at least one optical coupler;
the optical module further comprising:
a planar optical waveguide member having a first optical circuit constituting a part of the optical switch and a second optical circuit constituting the optical coupler; and
an actuator structure, supported by the planar optical waveguide member, constituting a part of the optical switch,
wherein the first optical circuit having two optical waveguides which are formed in the planar optical waveguide member and cross over to each other and a groove provided at a cross region of the two optical waveguides;
a second actuator section comprises a movable mirror for reflecting light passing through the optical waveguide member, and driving means for moving the movable mirror, the movable mirror being disposed so as to be inserted into the groove; and
the movable mirror is attached to a cantilever supported by the planar waveguide member.

* * * * *